(12) United States Patent
Hirsch et al.

(10) Patent No.: US 7,971,810 B2
(45) Date of Patent: Jul. 5, 2011

(54) FOOD WASTE DISPOSER WITH PWM BASED CONTROL OF GRINDING PROFILE

(75) Inventors: Nicholas J. Hirsch, Wind Lake, WI (US); Steven Harry Plume, Springdale, AR (US)

(73) Assignee: Emerson Electric Co., St. Louis, MO (US)

( * ) Notice: Subject to any disclaimer, the term of this patent is extended or adjusted under 35 U.S.C. 154(b) by 328 days.

(21) Appl. No.: 12/204,827

(22) Filed: Sep. 5, 2008

(65) Prior Publication Data
US 2009/0060477 A1 Mar. 5, 2009

Related U.S. Application Data

(60) Provisional application No. 60/967,579, filed on Sep. 5, 2007.

(51) Int. Cl.
*B02C 25/00* (2006.01)
(52) U.S. Cl. ......................................................... 241/35
(58) Field of Classification Search .................... 241/33, 241/35, 36
See application file for complete search history.

(56) References Cited

U.S. PATENT DOCUMENTS

| | | | |
|---|---|---|---|
| 4,556,467 A * | 12/1985 | Kuhn et al. | 204/193 |
| 5,672,945 A | 9/1997 | Krause | |
| 6,007,006 A | 12/1999 | Engel et al. | |
| 6,481,652 B2 | 11/2002 | Strutz et al. | |
| 6,563,284 B2 | 5/2003 | Teutsch et al. | |
| 6,633,149 B1 | 10/2003 | Foureys | |
| 6,648,252 B2 | 11/2003 | Strutz | |
| 6,854,673 B2 | 2/2005 | Strutz et al. | |
| 7,048,213 B2 | 5/2006 | Strutz et al. | |
| 2002/0104909 A1* | 8/2002 | Strutz | 241/46.013 |
| 2003/0094524 A1 | 5/2003 | Scuccato | |
| 2004/0112999 A1 | 6/2004 | Byram et al. | |
| 2005/0279870 A1* | 12/2005 | Scuccato | 241/101.2 |
| 2006/0032951 A1 | 2/2006 | Berger et al. | |
| 2007/0278883 A1 | 12/2007 | Marcenaro et al. | |
| 2008/0008459 A1 | 1/2008 | Haesters et al. | |
| 2008/0067270 A1 | 3/2008 | Strutz | |

FOREIGN PATENT DOCUMENTS

| | | |
|---|---|---|
| WO | WO-2007072025 A2 | 6/2007 |
| WO | WO-2008003710 A1 | 1/2008 |

OTHER PUBLICATIONS

International Search Report and Written Opinion of the International Searching Authority for PCT/US2008/010433.
Pulse Width Modulated (PWM), D.E. Teske; May 7, 2002.

* cited by examiner

*Primary Examiner* — Faye Francis
(74) *Attorney, Agent, or Firm* — Harness, Dickey & Pierce, P.L.C.

(57) ABSTRACT

A food waste disposer has a motor driven with pulse width modulation ("PWM"). A grinding profile is controlled based on PWM values of the PWM controller driving the motor. In an aspect, controlling the grinding profile includes varying the speed of the motor based on the PWM values. In an aspect, the grinding profile is initiated after the food waste disposer is started and a PWM value exceeds a set value indicating the presence of a grinding load in a grinding section of the food waste disposer. In an aspect, it is determined that the grinding load has been sufficiently ground once the PWM value does not exceed a first set value after the grinding profile has been initiated. In an aspect, corrective action is initiated when the PWM value exceeds the set value after a predetermined period of time.

20 Claims, 4 Drawing Sheets

FOOD WASTE DISPOSER WITH PWM BASED CONTROL OF GRINDING PROFILE

CROSS-REFERENCE TO RELATED APPLICATIONS

This application claims the benefit of U.S. Provisional Application No. 60/967,579, filed on Sep. 5, 2007. The disclosure of the above application is incorporated herein by reference.

FIELD

The present disclosure relates to food waste disposers.

BACKGROUND

Turning to the drawings, FIG. 1 depicts a prior-art food waste disposer 100, which is described in U.S. Pat. No. 6,854,673. U.S. Pat. No. 6,854,673 is incorporated by reference herein in its entirety. The disposer 100 may be mounted in a well-known manner in the drain opening of a sink using conventional mounting members of the type disclosed in U.S. Pat. No. 3,025,007, which is incorporated herein by reference in its entirety. The disposer includes an upper food conveying section 102, a central grinding section 104 and a variable speed motor section 106. The central grinding section 104 is disposed between the food conveying section 102 and the variable speed motor section 106.

The food conveying section 102 conveys the food waste to the central grinding section 104. The food conveying section 102 includes an inlet housing 108 and a conveying housing 110. The inlet housing 108 forms an inlet at the upper end of the food waste disposer 100 for receiving food waste and water. The inlet housing 108 is attached to the conveying housing 110. A rubber o-ring 112 may be used between the inlet housing 108 and conveying housing 110 to prevent external leaks. A sealant bead may also be used instead of the rubber o-ring 112. The sealant bead is preferably composed of a tacky, malleable material that fills any voids between the inlet housing 108 and the conveying housing 110 and tempers any irregularities in the opposing surfaces of the housings. Some suitable malleable materials for the sealant bead include butyl sealant, silicone sealant, and epoxy.

The conveying housing 110 has an opening 114 to receive a dishwasher inlet 116. The dishwasher inlet 116 is used to pass water from a dishwasher (not shown). The inlet housing 108 and conveying housing 110 may be made of metal or injection-molded plastic. Alternatively, inlet housing 108 and conveying housing 110 may be one unitary piece.

The central grinding section 104 includes a grinding mechanism having a shredder plate assembly 118 and a stationary shredder ring 120. In one embodiment, the shredder plate assembly 118 may include an upper rotating plate 122 and a lower lug support plate 124. The upper rotating plate 122 and lower lug support plate 124 are mounted to a rotatable shaft 126 of the variable speed motor section 106. A portion of the conveying housing 110 encompasses the grinding mechanism. The grinding mechanism shown in FIG. 1 is a fixed lug grinding system. Alternatively, a moveable lug assembly could be used such as that disclosed in U.S. Pat. No. 6,007,006 (Engel et al.), which is incorporated herein in its entirety by reference. The grinding mechanism could alternatively use both a fixed lug assembly and a moveable lug assembly.

The shredder ring 120, which includes a plurality of spaced teeth 128, is fixedly attached to an inner surface of the conveying housing 110 by an interference fit and is preferably composed of stainless steel but may be made of other metallic material such as galvanized steel. As shown in FIG. 1, ramps 129 formed on the inside wall of the housing 110 may also be used to retain the shredder ring 120 in the housing 110.

In the operation of the food waste disposer 100, the food waste delivered by the food conveying section 102 to the grinding section 104 is forced by the lugs 142 on the shredder plate assembly 118 against the teeth 128 of the shredder ring 120. Shredder plate assembly 118 may also include tumbling spikes 144. The sharp edges of the teeth 128 grind or comminute the food waste into particulate matter sufficiently small to pass from above the upper rotating plate 122 to below the plate via gaps between the teeth 128 outside the periphery of the plate 122. Due to gravity and water flow, the particulate matter that passes through the gaps between the teeth 128 drops onto a plastic liner 160 and, along with water entering into the disposer 100 via the inlet to the inlet housing 108, is discharged through a discharge outlet 162 into a tailpipe or drainpipe (not shown). To direct the mixture of particulate matter and water toward the discharge outlet 162, the plastic liner 160 is sloped downward toward the periphery side next to the discharge outlet 162. The discharge outlet 162 may be formed as part of a die-cast upper end bell 164. Alternatively, the discharge outlet 162 may be separately formed from plastic as part of the outer housing of the disposer. The outer surface of the discharge outlet 164 allows a tailpipe or drainpipe to be connected to the discharge outlet 162.

The variable speed motor section 106 includes a switched reluctance machine 180 having a stator 182 and a rotor 184. Stator 182 includes windings 194. The rotor imparts rotational movement to the rotatable shaft 126. The switched reluctance machine 180 is enclosed within the housing 174 extending between the upper and lower end frames 164 and 176. Alternatively, a brushless permanent magnet motor or controlled induction motor could be used. A controller 220 controls switched reluctance machine 180.

Referring back to FIG. 1, as described earlier, the upper end bell 164 separates the grinding section 104 from the variable speed motor section 106. The upper end bell 164 may dissipate the heat generated by the switched reluctance machine 180, prevents particulate matter and water from contacting the switched reluctance machine 180, and directs the mixture of particulate matter and water to the discharge outlet 162.

The plastic liner 160 is attached to the die-cast upper end bell 164 by screws or bolts 166. The upper end bell 164 is attached to the conveying housing 110 by screws or bolts 168. To prevent external leaks, a ring bracket 170 and o-ring or sealer 172 may be used to secure the connection between the conveying housing 110 and the upper end bell 164.

The upper end bell 164 is used to separate the central grinding section 104 and the variable speed motor section 106. The variable speed motor section 106 is housed inside a housing 174 and a lower end frame 176. The housing 174 may be formed from sheet metal and the lower end frame 176 may be formed from stamped metal. The housing 174 and lower end frame 176 are attached to the upper end bell 164 by screws or bolts 178.

To align the rotatable shaft 126 and, at the same time, permit rotation of the rotatable shaft 126 relative to the upper end bell 164, the upper end bell 164 has a central bearing pocket 165 that houses a bearing assembly 200. In one embodiment, the bearing assembly 200 encompasses the rotatable shaft 126 and comprises of a sleeve bearing 202, a sleeve 204, a spacer 205, a rubber seal 206, a slinger 208 and a thrust washer 210. The sleeve bearing 202 is pushed into the smaller portion of the central bearing pocket 165. The sleeve bearing 202 is preferably made of powered metal having lubricating material. The thrust washer 210 is placed on top of the bearing 202. The steel sleeve 204 encompasses the rotatable shaft 126 and is positioned above the thrust washer 210 and sleeve bearing 202. The steel sleeve 204 resides on an upper end portion 127 of the rotatable shaft 126. The upper end portion 127 is shaped as a double D to receive the shredder plate assembly 118. The shredder plate assembly 118 rests on the spacer 205. A bolt 211 is used to hold the shredder plate assembly 118 to the rotatable shaft 126. To keep out debris, rubber seal 206 slides over the steel sleeve 204 and rests in a larger portion of the central bearing pocket 165 of the upper end bell 164. Steel cap or slinger 208 is placed on top of the rubber seal 206.

The bottom of the rotatable shaft 126 is permitted to rotate relative to the lower end frame 176 by the use of bearing assembly 212. The lower bearing assembly 212 includes a housing 214 and a spherical bearing 216. The spherical bearing 216 is preferably made of powdered metal having lubricating material.

SUMMARY

A method of controlling a grinding profile of a food waste disposer having a motor driven with pulse width modulation ("PWM") includes controlling a grinding profile of the food waste disposer based on PWM values of the PWM driving the motor. In an aspect, controlling the grinding profile includes varying the speed of the motor based on the PWM values. In an aspect, the grinding profile is initiated after the food waste disposer is started and a PWM value exceeds a set value indicating the presence of a grinding load in a grinding section of the food waste disposer.

In an aspect, initiating the grinding profile includes increasing a speed of the motor from an idle speed to a grinding speed.

In an aspect, the method includes determining that the grinding load has been sufficiently ground once the PWM value does not exceed a first set value after the grinding profile has been initiated. In an aspect, after includes determining that the grinding load has been sufficiently ground, the method includes determining that the grinding load has been flushed from the grinding section if the PWM value does not exceed a second set value that is lower than the first set value and shutting the food waste disposer down upon determining that the grinding load has been flushed from the grinding section.

In an aspect, the method includes initiating corrective action when the PWM value exceeds the set value after a predetermined period of time. In an aspect, initiating corrective action includes reversing a direction of rotation of the motor. In an aspect, initiating corrective action includes changing a speed of the motor. In an aspect, initiating corrective action includes initiating an anti-jam sequence.

DRAWINGS

The drawings described herein are for illustration purposes only and are not intended to limit the scope of the present disclosure in any way.

DETAILED DESCRIPTION

Figure 1:
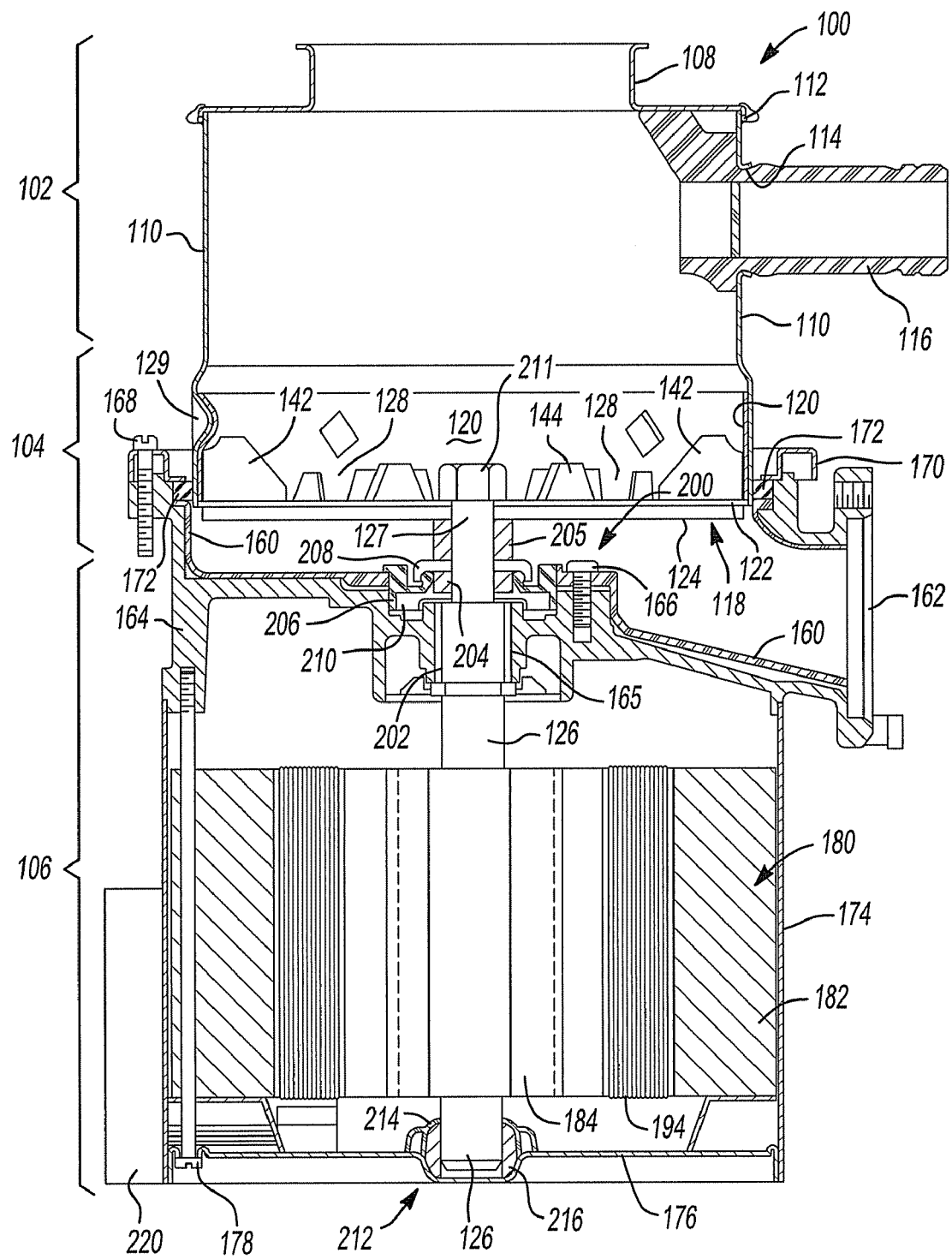
FIG. 1 is a cross-sectional view of a prior-art food waste disposer.

The following description is merely exemplary in nature and is not intended to limit the present disclosure, application, or uses. It should be understood that throughout the drawings, corresponding reference numerals indicate like or corresponding parts and features.

Figure 2:
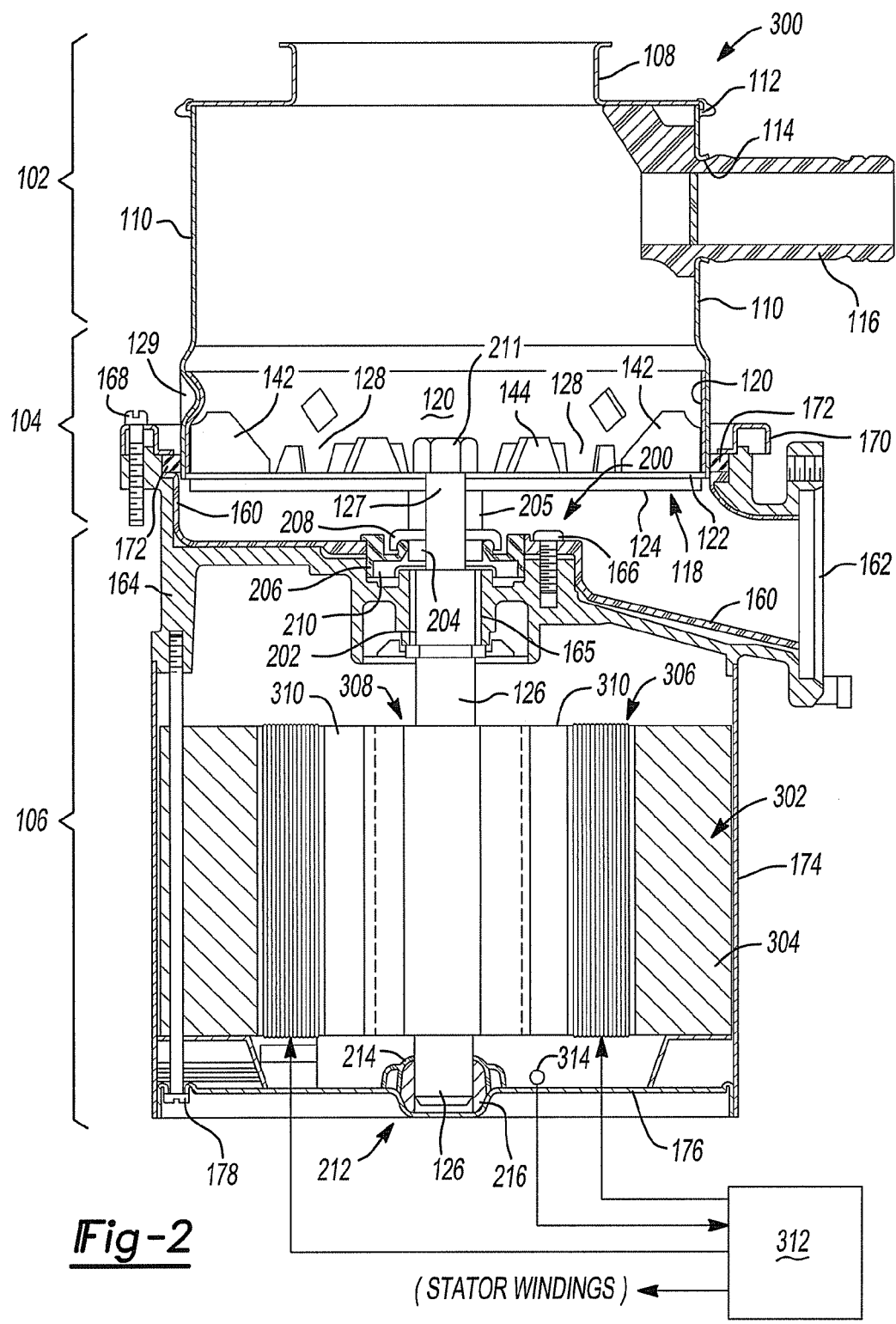
FIG. 2 is a cross-sectional view of a food waste disposer in accordance with an aspect of the present disclosure.

With reference to FIG. 2, a food waste disposer 300 having pulse width modulation (PWM) based control of a grinding profile of food waste disposer 300 in accordance with an aspect of the present disclosure is shown. As used herein, "grinding profile" means the speeds at which the motor of food waste disposer is run during the grinding of food waste. The grinding profile can also include the direction of rotation at which the motor of the food waste disposer 300 is run during the grinding of food waste. Elements in common with the elements of FIG. 1 are identified with the same reference numbers and the discussion focuses on the differences. Variable speed motor section 106 of food waste disposer 300 illustratively has a brushless permanent magnet motor ("BPM motor") 302 in which control of the grinding profile of food waste disposer 300 is based on pulse width modulation of the BPM 302, as described in more detail below. BPM motor 302 includes stator 304 having windings 306 and rotor 308 having permanent magnets 310, illustratively mounted around an outer periphery of rotor 308. A BPM motor uses electrical commutation eliminating the need for brushes. The rotor position must be known for an electrically commutated BPM motor to work, and in this regard the BPM motor can employ a rotor position sensor or a sensorless drive. For a BPM motor employing a position sensor, sensing devices such as Hall effect sensors 314 (only one of which is shown) can be used to determine rotor position. Alternatively, sensorless drives, which do not require position sensors, are also available. In these sensorless drives, the rotor position is determined by analyzing electrical aspects of the motor. In either approach, an electronic controller (motor drive), such as controller 312 having outputs coupled to stator windings 306, is required to properly sequence voltage to the various phases of the BPM motor 302. Where sensors such as Hall effect sensor 314 are used to determine rotor position, they are coupled to inputs of the controller, such as controller 312. Controllers for controlling BPM motors are known in the art and such a known controller can be used for controller 312, but programmed to implement the functionally described below, it being understood that such known BPM motor controllers have not had the below described functionality as applied to a food waste disposer.

In certain situations it is desirable for the disposer to automatically monitor its grind performance and then based on that performance react. The reaction can be to automatically shutoff when grinding is complete or if material is taking too long to grind reverse directions and/or change speeds of the disposer in order to reorient the material for improve grind performance. In accordance with an aspect of the present disclosure, a PWM value which is used to control the function of a BPM motor in the disposer, is also used to monitor grind performance. Based on predetermined PWM values, controller 312 is programmed to perform different functions improving overall grind performance and customer satisfaction.

Prior art approaches have used current draw of the motor of the food waste disposer to monitor grind performance. In general, un-amplified current is not sensitive enough to detect subtle changes in grind performance such as material riding or when small amounts of food are left in the grinding section. This inability to sense accurately what is happening in the grinding section can lead to extra long grind times or the food waste disposer shutting off prematurely leaving material in the grinding section. A potential solution to improve the sensitivity of motor current is to amplify the current. This however can cause increased EMI from the motor and controller, which in turn adds filtering costs to both.

Figure 3:
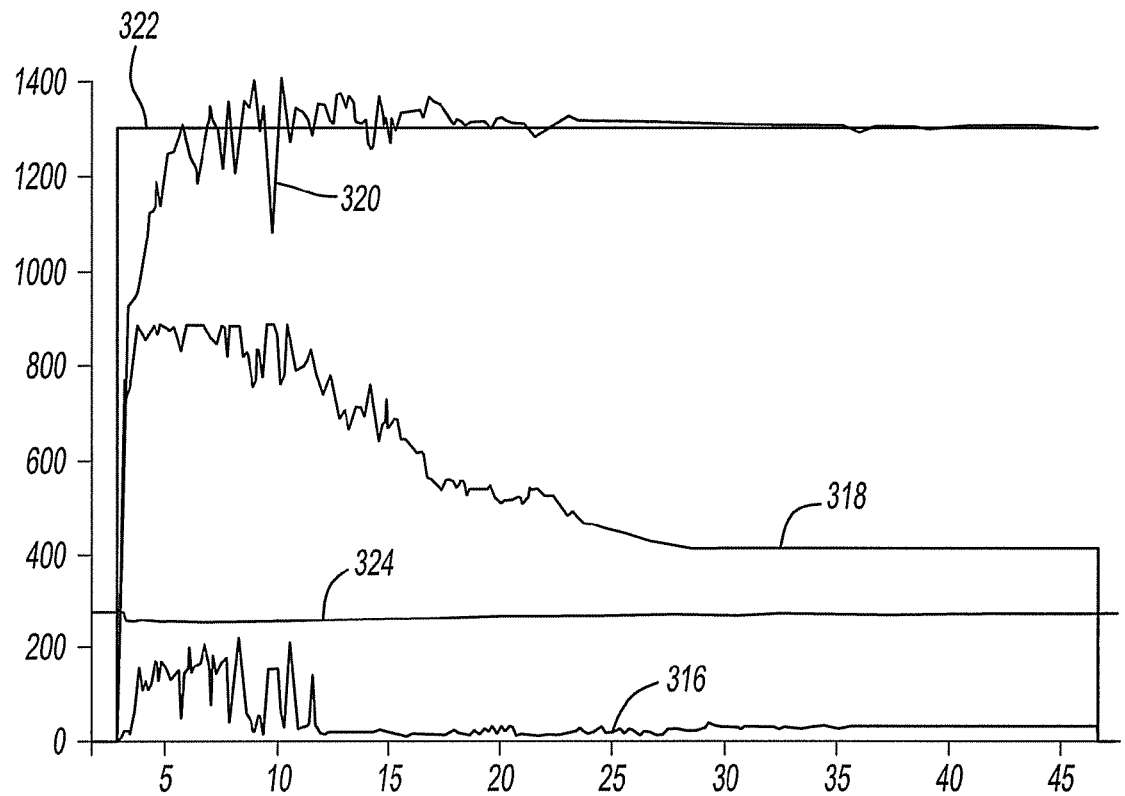
FIG. 3 is a control plot of the brushless permanent magnet motor of the food waste disposer of FIG. 2 while grinding carrot loads where no grinding anomalies were encountered.
Figure 4:
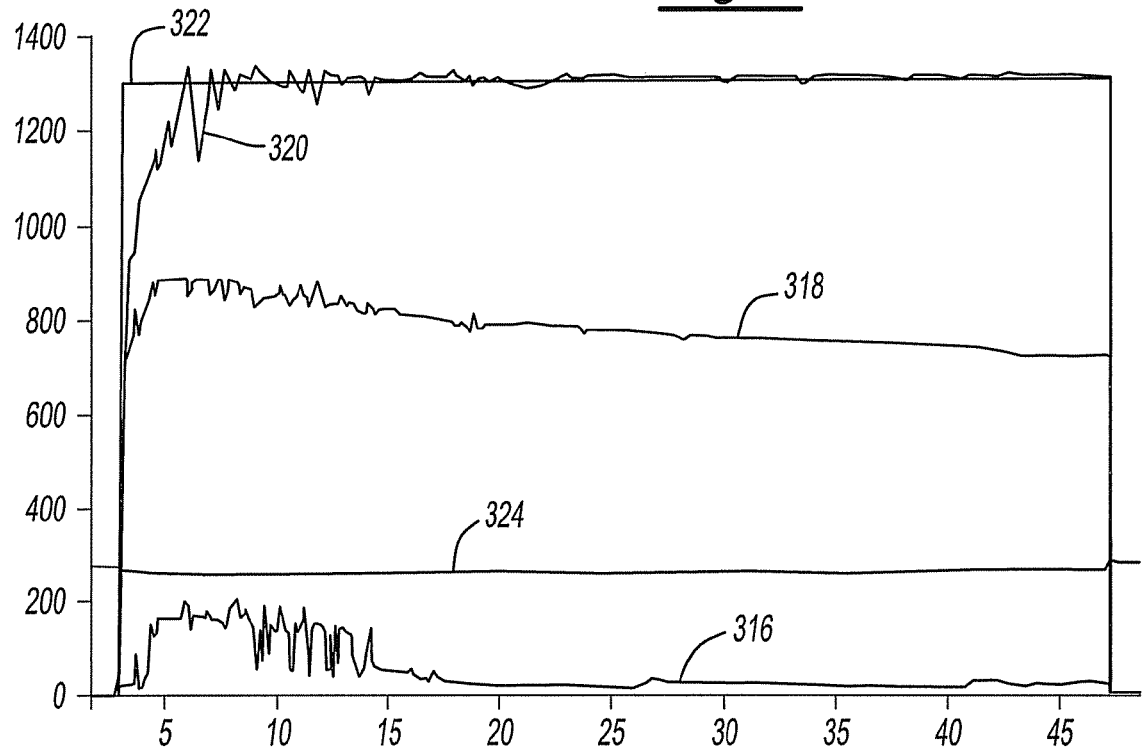
FIG. 4 is a control plot of the brushless permanent magnet motor of FIG. 2 while grinding carrot loads where grind performance was being adversely affected by material riding in front of a lug and not being ground.

FIGS. 3 and 4 show the control plots of a BPM motor powered disposer while grinding carrot loads. FIG. 3 shows the control plots when material is ground through the food waste disposer without encountering any grinding performance anomalies. FIG. 4 represents a control plot where grind performance was being adversely affected by material riding in front of a lug and not being ground. Germane to this discussion in each of FIGS. 3 and 4 is line 316 representing the motor current and the line 318 representing a PWM value. (Line 320 represents actual motor speed, line 322 represents target motor speed, and line 324 represents bus voltage.) The PWM value is the duty cycle of the PWM signal output by the motor controller 312 to drive the brushless permanent magnet motor 302 of food waste disposer 300. In both FIGS. 3 and 4, note how the motor current value drops to a fairly constant value within 10 to 15 seconds of grinding and looks similar in both figures despite radically different grind performance between the two conditions. Now looking at the PWM values in these two plots there is a more dramatic difference in PWM values for the two grind results. In FIG. 3, the PWM value drops to a stable value at a much more gradual rate than the motor current. In FIG. 4, where the carrot rode, the PWM value stayed high. By using the PWM value, controller 312 is programmed to react if a predetermined drop in the PWM value is not seen after a set period once grinding is initiated.

The PWM value is more sensitive than un-amplified current. This allows the control program to more accurately detect when a grinding load is present in the grinding section of the food waste disposer. Not amplifying the current lowers the electromagnetic interference ("EMI") generated by the food waste disposer.

Figure 5:
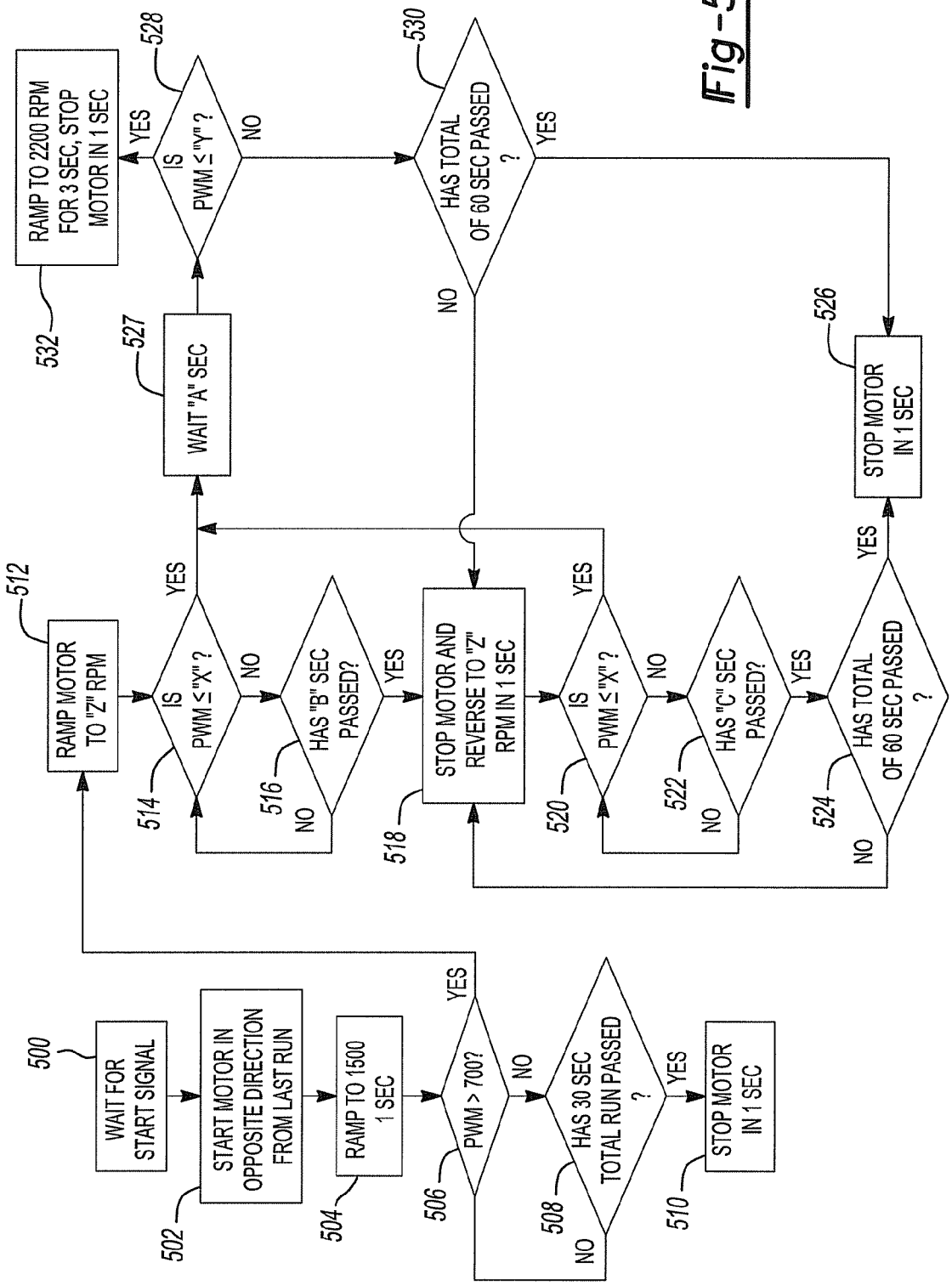
FIG. 5 is a flow chart of an illustrative control program for controlling the food waste disposer of FIG. 2.

FIG. 5 is a flow chart of one possible illustrative control program for controller 312 utilizing PWM values to control the grinding profile of food waste disposer 300 where the controller 312 is programmed to execute 3 different reactions based on PWM values: 1) Start the food waste disposer 300 at a low RPM (idle mode) until the PWM value rises above a set value. PWM values will rise once a load (e.g., water or material such as food waste) is introduced into the grinding section, at which time a grinding profile is initiated. The PWM value rises because the load in the grinding section loads the motor and the motor controller increases the PWM value to increase power to the motor to maintain the motor speed. The idle mode reduces no load, no water noise and reduces energy use. 2) Once the grinding profile is initiated, the food waste disposer 300 will shut down automatically once a predetermined PWM value is achieved, therefore adjusting the length of the grind cycle based on the load size and how it is being ground. 3) Once the grind cycle is initiated, if a predetermined PWM value is not achieved in a set time period, the food waste disposer 300 takes corrective action such as reversing grind direction (i.e., the direction of rotation of BPM motor 302) to reorient the material being ground and repeats the reversing cycle until the load grinds or a maximum time interval is reached, at which point food waste disposer 300 shuts down. Other possible corrective actions when not achieving the predetermined PWM value are to change the motor RPM or activate an anti-jam sequence.

Starting at block 500 in FIG. 5, the controller 312 waits for a start signal, such as user turning the food waste disposer on. Upon receipt of the start signal, controller 312 at block 502 starts motor 302 in the opposite direction from which motor 302 was last run. At block 504, controller 312 ramps the speed of motor 302 to an idle speed, illustratively 1500 rpm, in a period of time such as one second. Controller 312 maintains the speed of motor 302 at the idle speed by adjusting the PWM value to increase or decrease the speed of the motor as needed. At block 506, controller 312 checks whether the PWM value has risen above a set value, illustratively 700, indicating that a load has been put on motor 302 by the introduction of a grinding load, such as food waste, into food waste disposer 300. In the illustrative example, a 100% duty cycle of the PWM may have a PWM value of 883 so the set value of 700 represents about a seventy-nine percent duty cycle of the PWM.

Putting a load on BPM motor 302 slows BPM motor 302 unless the power provided to BPM motor 302 is increased. Increasing the PWM value increases the power provided to BPM motor 302 and controller varies the PWM value to maintain the speed of BPM motor 302.

If the PWM value has not exceeded the set value, controller 312 next checks at block 508 whether a set period of time, such as thirty seconds, has elapsed. If not, controller 312 returns to block 506. If the set period of time has elapsed, controller 312 then stops motor 302 at block 510, such as ramping the speed of motor 302 down to a stop over a period of time, such as one second.

If at block 506 controller 312 determines that the PWM value has exceeded the set value, controller 312 initiates a grinding profile and ramps the speed of motor 302 to a first grinding speed at block 512. Controller 312 then starts a check at block 514 to see if the load on motor 302 is below a set level, indicating that the grinding load in the grinding section has been ground sufficiently and the food waste disposer is not experiencing any grinding anomalies, such as by way of example and not of limitation, material riding in front of a lug and not being ground as discussed above. If the load on BPM motor 302 is below the set level, the grinding load in the food waste disposer has been sufficiently ground and food waste disposer 300 is not experiencing a grinding anomaly. If the load on BPM motor 302 is above the set level, the grinding load in the grinding section has not been sufficiently ground since it is still loading BPM motor 302 above the set level, and/or food waste disposer 302 is experiencing a grinding anomaly. Controller 312 does so by checking whether the PWM value is above a second set value X. X may illustratively be slightly lower than the first set level. X by way of example and not limitation may be 650. If the PWM value is above X, indicating that the grinding load in the grinding section has not been sufficiently ground and/or food waste disposer 300 is experiencing a grinding anomaly, controller 312 then checks at 516 whether a set period of time (B) has elapsed. B may be ten seconds by way of example and not of limitation. If not, controller 312 returns to block 514. If the set period of time B has elapsed, controller 312 at block 518 then takes corrective action by reversing the direction of rotation of BPM motor 302 and ramps it to the grinding speed Z in a set period of time, such as one second, in an attempt to reorient the grinding load in the grinding section. Alternatively, at block 518, controller 312 changes the speed of motor 302. Alternatively, at block 518, controller 312 initiates an anti-jam sequence. By way of example and not of limitation, the anti-jam sequence may include a sequence of reversals of the direction of rotation of motor 302, applying a series of torque pulses to BPM motor 302, or any combination thereof. The anti-jam sequence may include by way of example and not of limitation, any of the anti-jam sequences described in U.S. Ser. No. 10/908,096 for "De-Jamming Device and Method" filed Apr. 27, 2005, the entire disclosure of which is incorporated herein by reference.

At block 520, controller 312 checks whether the food waste disposer 300 has sufficiently ground the grinding load and is not experiencing a grinding anomaly by checking whether the load on BPM motor 302 is below the set level. Again, it does so by checking whether the PWM value is above the second set value X.

If the grinding load in the grinding section of the food waste disposer 300 has not been sufficiently ground and/or food waste disposer 300 is experiencing a grinding anomaly, controller 312 then checks at block 522 whether a set period of time (C) has elapsed. C by way of example and not of limitation may be ten seconds. It should be understood that the set period of time C can be equal or different to the set period of time B. If not, controller 312 returns to block 520.

If the set period of time C has elapsed, controller 312 then checks at block 524 whether the total allowed grinding period (the period from the time the grinding profile was initiated at block 512) has elapsed. By way of example and not of limitation, the total allowed grinding period may illustratively be sixty seconds. If not, controller 312 returns to block 518 where it again attempts to reorient the grinding load in the grinding section by reversing motor 302 and then continuing as described above.

If the total allowed grinding period has elapsed, controller 312 then shuts motor 302 down at block 526 by ramping the speed of BPM motor 302 to a stop over a period of time, such as one second.

If controller 302 determines at blocks 514 or 520 that the grinding load in the grinding section has been sufficiently ground and that food waste disposer 300 is not experiencing a grinding anomaly, controller 302 branches to block 527 where it waits a set period of time (A) and then checks at block 528 whether the grinding load in the grinding section has been flushed from food waste disposer 300 and only water remains in the grinding section or the grinding section is empty (if water was turned off). Controller 302 does so by checking whether the load on BPM motor 302 is below a set level by checking whether the PWM value is above a third set value Y. It should be understood that Y is at least 20% lower than X. For example, Y may be 450 when X is 650.

If the PWM value is above Y, the grinding load in the grinding section has not been flushed and/or food waste disposer 300 is experiencing a grinding anomaly. Controller 312 then checks at block 530 whether the total allowed grinding period has elapsed. If not, controller 312 branches back to block 518 where it attempts to reorient the grinding load in the grinding section by reversing motor 302, and then proceeding as discussed above. If the total grind period has elapsed, controller 312 branches to block 524 where it shuts BPM motor 302 down.

Returning to block 528, if the PWM value is not above Y, then the grinding load in the grinding section has been flushed and the food waste disposer 300 is not experiencing a grinding anomaly. Controller 312 then branches to block 532 where it shuts food waste disposer 300 down via a shut down sequence where it ramps the speed of BPM motor 302 to a set speed, such as 2200 RPM by way of example and not of limitation for a set period of time, such as three seconds by way of example and not of limitation. It then shuts BPM motor 302 down by ramping the speed of motor 302 down to stop of a period of time, such as one second.

It should be understood that A, B, C, X, Y, Z may be determined heuristically for a given type of food waste disposer. In the above described example, the food waste disposer 300 may illustratively be an Evolution® food waste disposer available from the Insinkerator division of Emerson Electric Company modified to control the grinding profile based on the PWM values. By way of example and not of limitation, BPM motor 302 may be a 0.4 HP BPM motor.

Although food waste disposer 300 and its control have been described with reference to a BPM motor, it should be understood that other motors can be used where the motor is driven with pulse width modulation. By way of example and not of limitation, a universal motor in which a controller driving the universal motor with a pulse width modulated drive signal or a controlled induction motor driven with a pulse width modulated drive signal could be utilized.

What is claimed is:

1. A method of controlling a grinding profile of a food waste disposer having a motor driven with pulse width modulation ("PWM"), comprising varying a duty cycle of the PWM driving the motor to maintain an actual speed of the motor at a desired speed, and controlling a grinding profile of the food waste disposer based on what the duty cycle of the PWM driving the motor is ("PWM Value") by setting the desired speed of the motor based on the PWM value.

2. The method of claim 1 wherein controlling the grinding profile includes changing the desired speed of the motor based on what the PWM Value is.

3. The method of claim 1 including initiating the grinding profile after the food waste disposer is started and the PWM Value exceeds a set value indicating the presence of a grinding load in a grinding section of the food waste disposer.

4. The method of claim 3 wherein initiating the grinding profile includes increasing the desired speed of the motor from an idle speed to a grinding speed.

5. The method of claim 3 including determining that the grinding load has been sufficiently ground once the PWM Value does not exceed a first set value after the grinding profile has been initiated.

6. The method of claim 5 including after determining that the grinding load has been sufficiently ground, determining that the grinding load has been flushed from the grinding section if the PWM Value does not exceed a second set value that is lower than the first set value and shutting the food waste disposer down upon determining that the grinding load has been flushed from the grinding section.

7. The method of claim 5 including initiating corrective action when the PWM Value exceeds the set value after a predetermined period of time.

8. The method of claim 7 wherein initiating corrective action includes reversing a direction of rotation of the motor.

9. The method of claim 7 wherein initiating corrective action includes changing a desired speed of the motor.

10. The method of claim 7 wherein initiating corrective action includes initiating an anti-jam sequence.

11. A food waste disposer, comprising:
a food conveying section that conveys food waste to a central grinding section;
a variable speed motor section including a variable speed motor driven by pulse width modulation ("PWM") from a controller, the controller varying a duty cycle of the PWM driving the motor to maintain an actual speed of the motor at a desired speed;
the central grinding section including a rotatable shredder plate rotated by the motor; and the controller controlling a grinding profile of the food waste disposer based on what the duty cycle that the PWM driving the motor is ("PWM Value") by setting the desired speed of the motor based on the PWM Value.

12. The apparatus of claim 11, wherein the controller controlling the grinding profile changes the desired speed of the motor based on what the PWM Value is.

13. The apparatus of claim 1 wherein the controller initiates the grinding profile after the food waste disposer is started and the controller determines that the PWM Value exceeds a set value indicating the presence of a grinding load in a grinding section of the food waste disposer.

14. The apparatus of claim 13 wherein the controller increases a desired speed of the motor from an idle speed to a grinding speed when the controller initiates the grinding profile.

15. The apparatus of claim 13 wherein the controller determines that the grinding load has been sufficiently ground once the PWM Value does not exceed a first set value after the grinding profile has been initiated.

16. The apparatus of claim 15 wherein the controller, once it determines that that the grinding load has been sufficiently ground, determines that the grinding load has been flushed from the grinding section if the PWM Value does not exceed a second set value that is lower than the first set value and shuts the food waste disposer down upon determining that the grinding load has been flushed from the grinding section.

17. The apparatus of claim 15 wherein the controller initiates corrective action upon determining that the PWM Value exceeds the set value after a predetermined period of time.

18. The apparatus of claim 17, wherein the controller reverses a direction of rotation of the motor when it initiates corrective action.

19. The apparatus of claim 17, wherein the controller changes a desired speed of the motor when it initiates corrective action.

20. The apparatus of claim 17, wherein the controller initiates an anti-jam sequence when it initiates corrective action.

* * * * *